Figure 1:
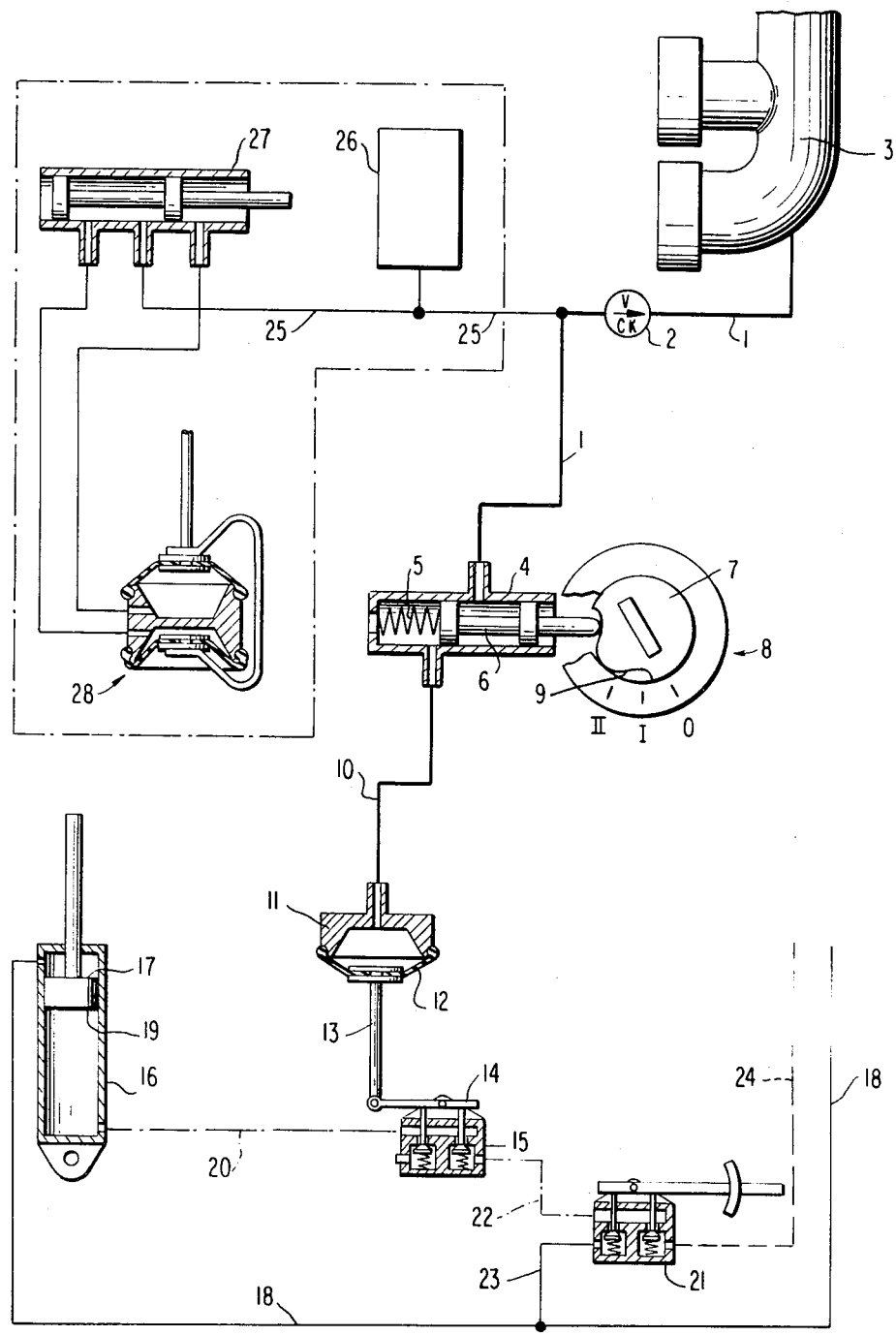

United States Patent
Andres et al.

[15] 3,687,215
[45] Aug. 29, 1972

[54] LOCKING SYSTEM FOR WINDOW LIFTERS ACTUATED BY AN AUXILIARY FORCE

[72] Inventors: Rudolf Andres, Sindelfinger, Württemberg; Hermann Moeller, Aidlingen, Württemberg, both of Germany

[73] Assignee: Daimler-Benz Aktiengesellschaft, Stuttgart-Unterturkheim, Germany

[22] Filed: June 8, 1970

[21] Appl. No.: 44,260

[30] Foreign Application Priority Data

June 12, 1969  Germany..........P 19 29 758.6

[52] U.S. Cl. ...................180/111, 49/35, 49/349, 70/264, 91/457, 137/383, 180/113, 180/114
[51] Int. Cl. ..............................................B60k 25/04
[58] Field of Search........180/112, 113, 111, 114, 82, 180/107, 108; 49/35,349; 137/383, 384.6, 384.8; 70/264; 91/457

[56] References Cited

UNITED STATES PATENTS

| | | |
|---|---|---|
| 2,911,212 | 11/1959 | Förster.......................49/349 |
| 3,543,041 | 11/1970 | Breitschwerdt et al......49/349 |
| 3,515,442 | 6/1970 | Whittemore...............180/114 |
| 3,502,167 | 3/1970 | Baxter et al. .............180/107 |
| 3,168,931 | 2/1965 | Oishei........................70/264 |

*Primary Examiner*—Benjamin Hersh
*Assistant Examiner*—John P. Silverstrim
*Attorney*—Craig, Antonelli and Hill

[57] ABSTRACT

A locking mechanism for window lifters actuated by an auxiliary force, particularly in motor vehicles with a load connected to a vacuum source, in which the initiation of the actuation of the window lifter is realized by a control valve that is selectively put into its through-position or closing position by the vacuum, depending on certain measures necessary for driving the vehicle or by the sequence of operation which takes place when stopping the motor vehicle.

14 Claims, 3 Drawing Figures

LOCKING SYSTEM FOR WINDOW LIFTERS ACTUATED BY AN AUXILIARY FORCE

The present invention relates to a locking installation for window lifters actuated by an auxiliary force, especially in motor vehicles, with at least one load or receiver connected to a vacuum or underpressure.

In motor vehicles with window lifters operated by an auxiliary force, energy is still available for the repeated actuation of the window lifters also after turning off of the pressure-producing unit by reason of the interconnection of a pressure tank in the feed line network. This condition is particularly critical, for example, if unattended children left behind in the vehicle play with the lifting installation whereby injuries may readily occur as a result of carelessness.

It is the purpose of the present invention to provide an installation by means of which no actuation of the window lifters is possible with a standing vehicle and turned-off driving engine or in the centrally locked condition.

Consequently, a locking mechanism for window lifters operated by an auxiliary force, especially in motor vehicles with at least one load or receiver connected to the vacuum source, is proposed in which according to the present invention, a shifting element serving for the initiation of the actuation of the window lifter is shifted into its through position or closing position by means of vacuum in dependence on measures necessary for the vehicle operation or by motion sequences occurring during the stoppage of the motor vehicle.

In one advantageous embodiment of the present invention, the ignition lock includes a control cam at its lock cylinder, which is sensed by the spring-loaded piston rod of a control valve connected with the vacuum source and acting on the diaphragm of a servomotor whereby the shifting element whose actuating lever is connected with the diaphragm by way of a linkage, then assumes its through position when the lock cylinder of the ignition lock is in the driving position.

In another embodiment of the present invention, the piston rod of the control valve is in operative connection with a solenoid which, in the driving position of the ignition lock is energized by way of a switch influenced by the ignition lock and displaces the piston rod against the pressure of a spring.

In a further advantageous embodiment of the present invention, at least one adjusting or actuating motor actuated by vacuum for the central locking system of the motor vehicle is provided which is operated by a manually actuated working valve that simultaneously so acts on a servo-motor causing the adjusting movement of the control valve that with an engaged central locking system, the control valve assumes its locking or closing position.

Accordingly, it is an object of the present invention to provide a locking system for window lifters actuated by an auxiliary force in motor vehicles which avoids by simple means the aforementioned shortcomings and drawbacks.

Another object of the present invention resides in a locking installation for window lifters operated by an auxiliary force which minimizes the danger of injury to children playing with the window actuator control devices.

A further object of the present invention resides in a locking installation for window lifters operated by an auxiliary force which renders impossible the actuation of the window lifters when the vehicle is standing still and the driving engine is stopped and/or when the door locks are locked by the centrally operated locking system.

Figure 2:
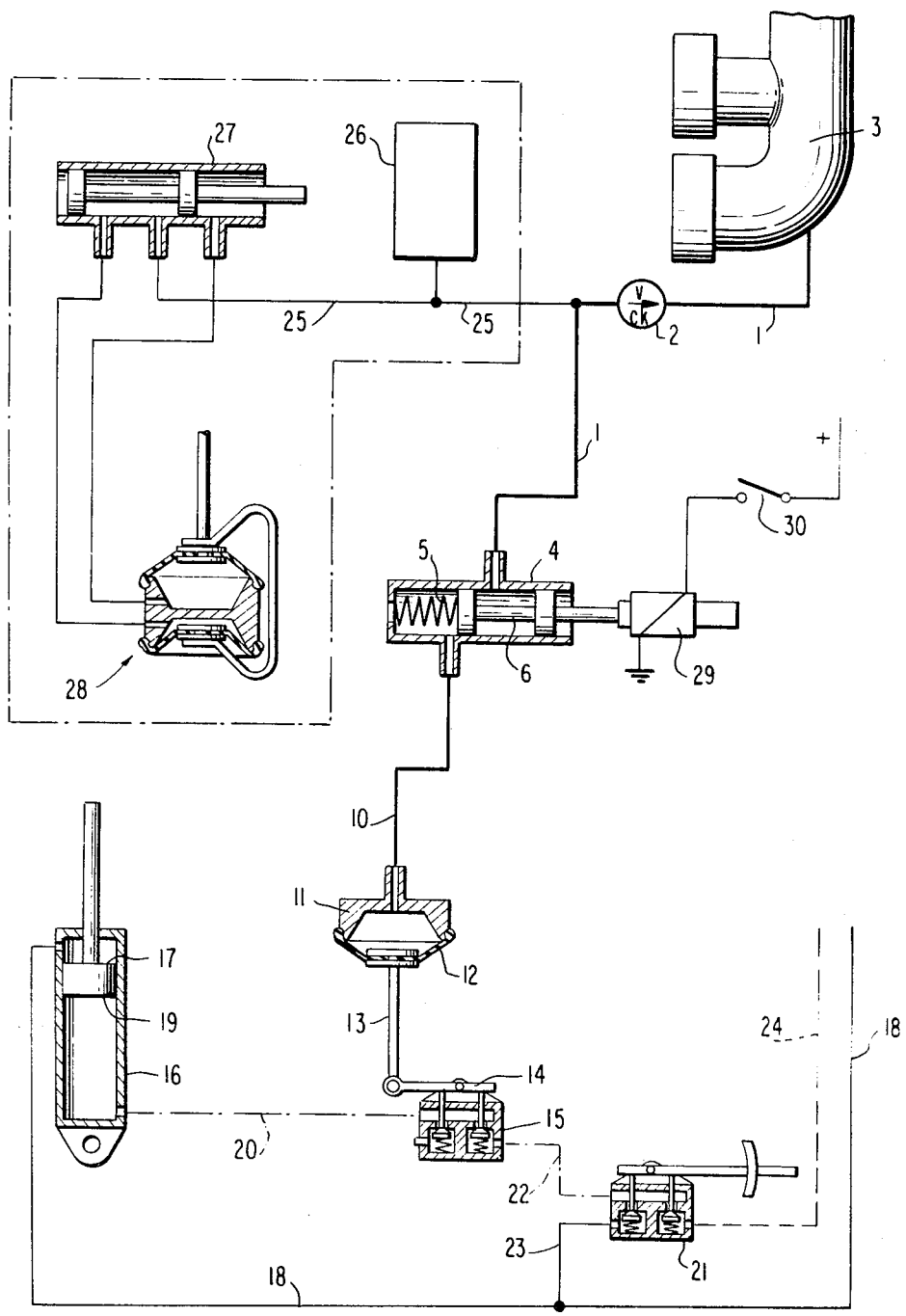
Figure 3:
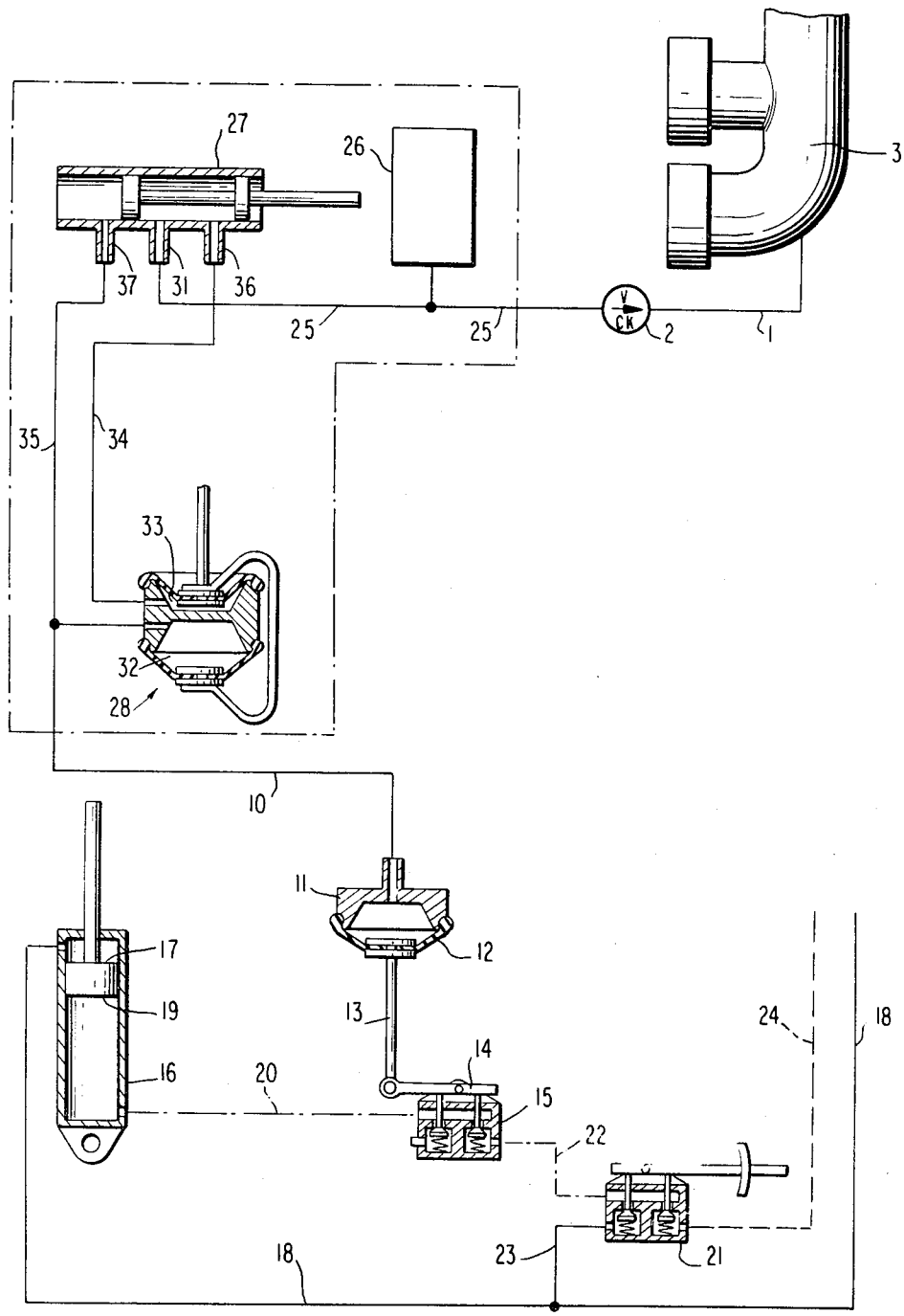

These and further objects, features, and advantages of the present invention will become more obvious from the following description when taken in connection with the accompanying drawing which shows, for purposes of illustration only, three embodiments in accordance with the present invention, and wherein:

FIG. 1 is a schematic diagram of a locking mechanism according to the present invention for a window lifter actuation whose locking movement is initiated by a control cam provided at the lock cylinder of the ignition lock;

FIG. 2 is a schematic diagram similar to FIG. 1, in which the initiation of the locking movement takes place by a solenoid controlled by the ignition lock and actuated by way of a switch; and FIG. 3 is a schematic diagram of a locking installation according to the present invention for a window lifter actuation in which the working valve of the central locking mechanism is used for the initiation of the locking movement.

Referring now to the drawing wherein like reference numerals are used throughout the various views to designate like parts, and more particularly to FIG. 1, as can be seen from this figure, a line 1 leads by interposition of a check valve 2 from the suction pipe 3 of an internal combustion engine (not shown) to a control valve 4 whose piston rod 6 acted upon by a spring 5 senses a control cam 9 provided at the lock cylinder 7 of the ignition lock generally designated by reference numeral 8. A line 10 leading from the control valve 4 is connected with a servo-motor 11 whose diaphragm 12 acts by way of a linkage 13 on the actuating lever 14 of a switching or shifting element 15 forming a control valve and shown only schematically. A cylinder 16 constructed as window lifter in a manner not illustrated in detail herein since it forms no part of the present invention and is of conventional construction, is connected on the side of its annular piston surface 17 with a line 18 which leads to a pressure unit (not shown) of any conventional construction.

The large piston surface 19 of the cylinder 16 is in communication by way of a line 20 with the outlet of the shifting element 15, to the input side of which is connected a line 22 leading to a schematically indicated control valve 21. Furthermore, a line 23 leads from the adjusting valve 21 to line 18 and a line 24 to a tank (not shown). A line 25 branches off from the line 1 and leads under interposition of a vacuum tank 26 to a manually operated working valve 27 which acts on an adjusting motor generally designated by reference numeral 28 serving for the central locking mechanism of otherwise conventional construction.

OPERATION

The operation of the window locking mechanism described above is as follows:

In the illustrated position of the ignition lock 8, no actuation of the cylinder 16 is possible since by reason of the position of the piston rod 6 abutting at the control cam 9, the line 10 is separated from the line 1 and the servo-motor 11 is in communication with the atmospheric air. The shifting element 15 assumes its closing position as a result thereof which is also not disturbed if the adjusting valve 21 is actuated. During the rotation of the lock cylinder 7 into the position indicated by "II," the piston rod 6 moves against the force of the spring 5 toward the left and connects the line 1 with the line 10. As a result thereof, the diaphragm 12 of the servo-motor is acted upon by the vacuum. The linkage 13 is pulled upward and the connected valve of the shifting element 15 is shifted into its through-position by the actuating lever 14. If the adjusting valve 21 is now actuated in one or the other direction, then the large piston surface 19 of the cylinder is selectively supplied with pressure medium or relieved which initiates in a conventional manner its window lifter actuation (not shown). For the sake of simplicity, only one cylinder 16 and one adjusting valve 21 coordinated thereto of the vehicle window lifter system are shown in FIGS. 1 to 3.

The control system illustrated in FIG. 2 has, in principle, the same construction and the same operation as that according to FIG. 1. Differing therefrom in the embodiment according to FIG. 2, the piston rod 6 is operatively connected with a solenoid 29 that in the driving position of the ignition lock (not shown) is energized by way of a switch 30 conventionally influenced by the ignition lock.

Also, the arrangement according to FIG. 3 is in its effect and operation similar to that of FIGS. 1 and 2. Differing from the embodiments of FIGS. 1 and 2 is the line connection of FIG. 3. The line 1 branching off from the suction pipe or intake manifold 3 leads under interposition of a check valve 2 directly to the line 25 which, in turn, leads to the central connection 31 of the working valve 27. The adjusting motor generally designated by reference numeral 28 is provided with two chambers 32 and 33 which are connected by means of lines 34 and 35 with the connections 36 and 37 of the working valve 27. The line 10 leading to the servo-motor 11 is connected with the line 35 so that with a manually engaged central locking mechanism (not shown) of which for the sake of simplicity only an associated adjusting motor 28 is illustrated, the shifting element 15 assumes its locking or closing position when the manually actuated control valve 27 is in the position shown in FIG. 3.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A locking installation for window lifters on a vehicle comprising: auxiliary force means for operating at least one window lifter provided on the vehicle vacuum means, said vacuum means including vacuum maintaining means for maintaining vacuum after engine shut down, shifting means for permitting an operative connection of said auxiliary force means with said at least one window lifter when said shifting means is in communication with said vacuum means and for preventing said operative connection when said shifting means is out of communication with said vacuum means, and control means for selectively blocking the communication between said shifting means and said vacuum means in response to a predetermined vehicle operating condition, whereby actuation of said window lifters by said auxiliary force means is precluded when said vehicle is in said predetermined vehicle operating condition.

2. A locking installation according to claim 1, characterized in that said control means includes a piston rod of a control valve which is operatively connected with a solenoid which is energized in the drive position of an ignition lock by way of a switch influenced by the ignition lock for displacing the piston rod against the force of a spring.

3. A locking installation according to claim 1, characterized in that at least one adjusting motor actuated by vacuum is provided for the central locking of the motor vehicle, said adjusting motor being controlled by a manually actuated working valve which simultaneously so acts on the servo-motor causing the adjusting movement of the control valve formed by said shifting means that with an engaged central locking, the control valve assumes its closing position.

4. An installation according to claim 1, characterized in that the vacuum means is operatively connected on an engine suction pipe.

5. An installation according to claim 4, characterized in that said vacuum maintaining means includes a reservoir tank for maintaining the vacuum after engine shut down.

6. An installation according to claim 1, characterized in that said control means includes means operatively connected to an ignition lock assembly having a rotatable lock cylinder whereby actuation of said window lifters is precluded when said lock cylinder is in a predetermined position.

7. An installation according to claim 6, characterized in that said lock cylinder includes a control cam portion for effecting control of a control valve arranged in a vacuum line between the vacuum means and the shifting means.

8. An installation according to claim 6, characterized in that said lock cylinder is connected to switch means for controlling electric solenoid means, said solenoid means being arranged to control a central valve arranged in a vacuum line between the vacuum means and the shifting means.

9. An installation according to claim 1, characterized in that said control means includes a control valve arranged in a vacuum line extending between said vacuum means and said shifting means, said control valve being selectively actuated in dependence on said predetermined vehicle operating condition.

10. An installation according to claim 9, characterized in that said control valve is actuated in dependence on the position of an ignition lock means provided for the engine of the vehicle.

11. An installation according to claim 10, characterized in that said ignition lock means has a control cam at its lock cylinder which controls the movement of a spring-loaded piston rod of the control valve.

12. An installation according to claim 11, characterized in that said shifting means includes a fluid servo-motor having a diaphram arranged in a vacuum line extending between said control valve and a line operatively communicating the auxiliary force means with the at least one window lifter, said control valve including means for selectively communicating said line leading to the diaphram with the atmosphere when said control cam is in a position corresponding to a stopped vehicle engine and with the vacuum means when said control cam is in a position corresponding to a driving condition of the vehicle, said shifting means further including an actuating lever attached to said diaphram.

13. A locking installation according to claim 9, characterized in that a piston rod of the control valve is operatively connected with a solenoid which is energized in the drive position of the ignition lock by way of a switch influenced by the ignition lock for displacing the piston rod against the force of a spring.

14. A locking installation according to claim 13, characterized in that at least one adjusting motor actuated by vacuum is provided for the central locking of the motor vehicle, said adjusting motor being controlled by a manually actuated working valve which simultaneously so acts on the servo-motor causing the adjusting movement of the control valve formed by said shifting means that with an engaged central locking, the control valve assumes its closing position.

* * * * *